Dec. 14, 1943.   H. V. CHRISTENSEN   2,336,845
CHECKING DEVICE
Filed Sept. 15, 1942   2 Sheets-Sheet 1

INVENTOR
Harold V. Christensen.
BY
Harness, Dickey & Pierce.
ATTORNEYS.

Dec. 14, 1943.                H. V. CHRISTENSEN                2,336,845
                                CHECKING DEVICE
                          Filed Sept. 15, 1942          2 Sheets-Sheet 2

INVENTOR
Harold V. Christensen
BY Harness, Dickey & Pierce.
ATTORNEYS.

UNITED STATES PATENT OFFICE 2,336,845

CHECKING DEVICE

Harold V. Christensen, St. Clair Shores, Mich., assignor to Michigan Tool Company, Detroit, Mich., a corporation of Delaware Application September 15, 1942, Serial No. 458,360

2 Claims. (Cl. 33—179.5)

The present invention relates to gear checking devices and particularly relates to a device for checking the tooth spacing, pressure angle and helix angle of worm gears.

One of the primary objects of the present invention is to provide improvements in devices for accurately checking the tooth spacing, pressure angle and helix angle of worm gears which are adapted to mesh with worms of the globoidal or Hindley type.

Other objects of the invention will become apparent from the following specification, the drawings relating thereto, and from the claims hereinafter set forth.

In the drawings, in which like numerals are used to designate like parts in the several views throughout;

Figure 1:
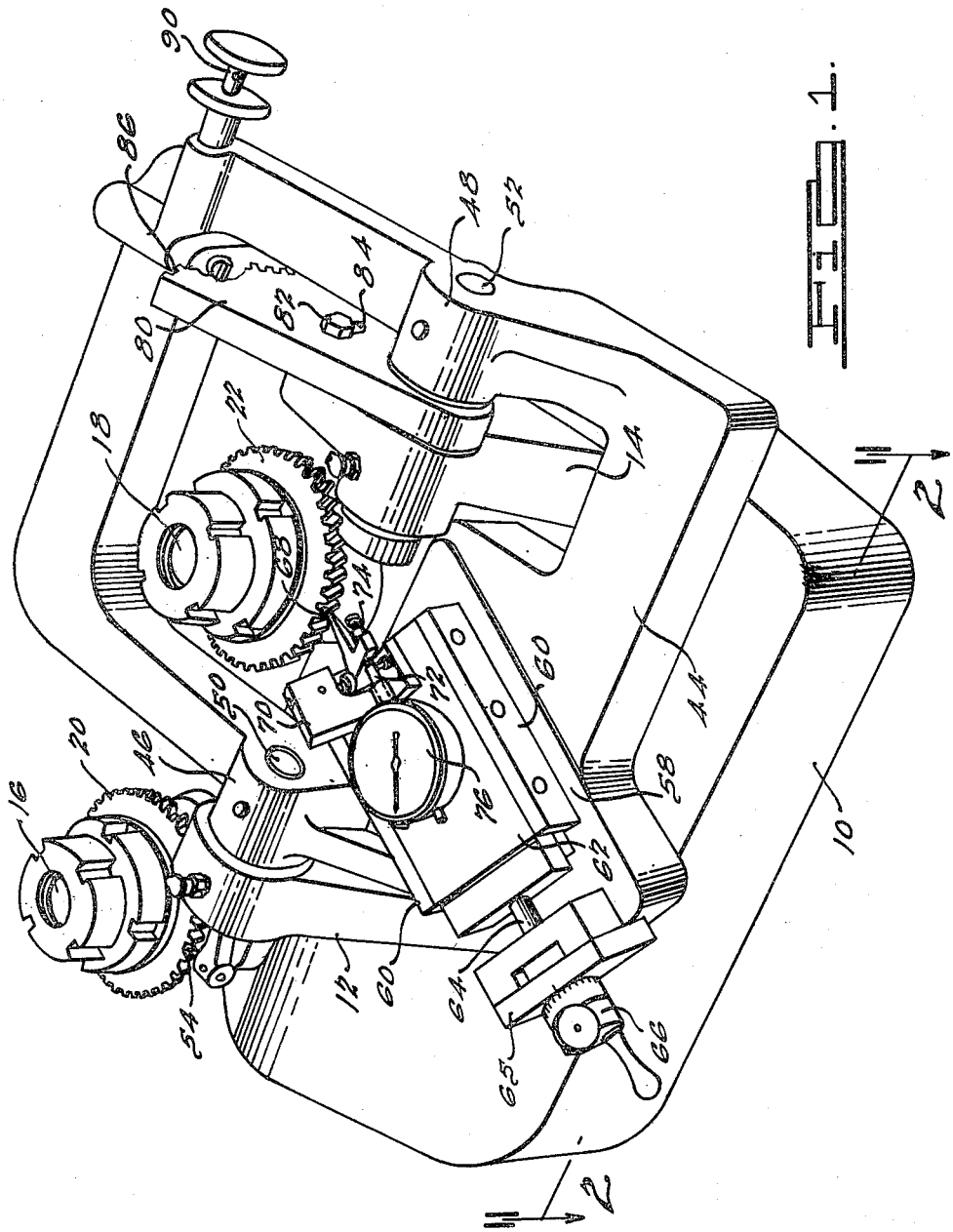
Figure 1 is a perspective view of a checking device embodying features of the present invention.
Figure 2:
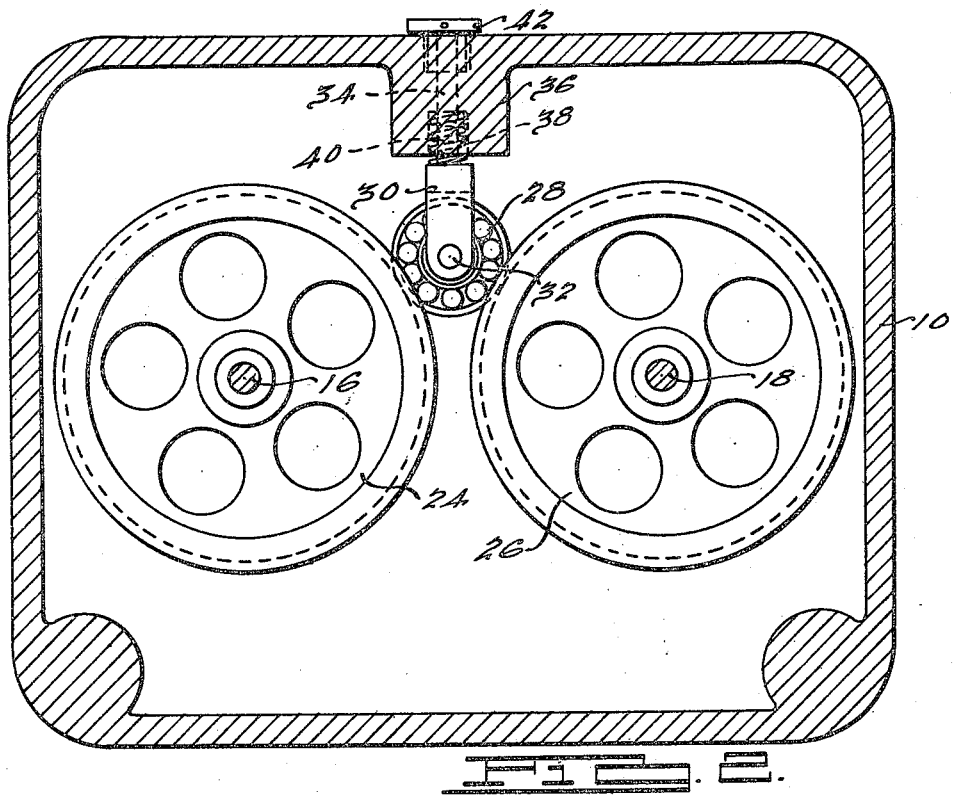
Fig. 2 is a cross sectional view taken substantially along the line 2—2 of Fig. 1.
Figure 3:
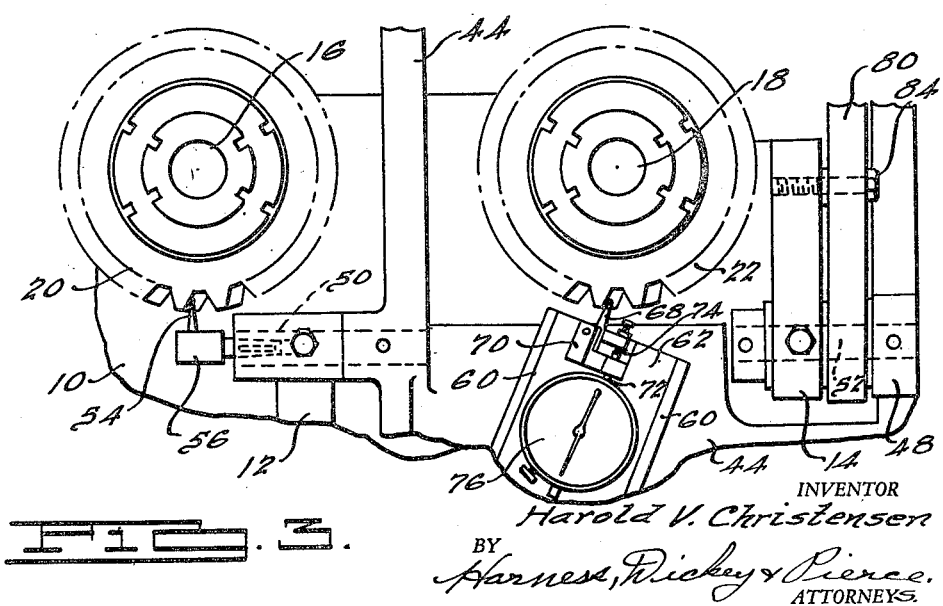
Fig. 3 is a fragmentary top plan view of the structure shown in Fig. 1.

Worm gears of the type to which the present invention is directed are adapted to mesh with gears of the globoidal or Hindley type. The worms and gears are characterized in that lines dawn in a plane of the axis of the worm are all tangent to a common base circle which may, for convenience, be called the base circle of the worm. Such circle is concentric with the axis of the worm gear of mating capacity with the worm and positioned in mating relation thereto. The radius of the base circle is determined by the pressure angle of the teeth of the worm. The tangential relationship between the lines representing extensions of the tooth sides and the base circle of the worm is utilized in the worm gear checking construction of the present invention.

In general, according to the present invention a master gear and the gear to be checked are mounted on parallel spindles which are connected together for synchronous rotation. A pair of fingers are mounted for bodily rotation with respect to the master gear and the gear to be checked. One of such fingers engages a tooth on the master gear and the other finger engages a tooth on the gear to be checked. The latter mentioned finger is mounted for movement into and out of coincidence with a tangent to the base circle of the worm of mating capacity and positioned in mating relation to the gears to be checked. Both fingers are mounted for broadly rotating about the axis of a mating worm. The finger engaging the gear to be checked is mounted for relative movement, with respect to the finger engaging the master gear, into and out of coincidence with a tangent to the base circle. Means are associated with this finger for recording deviations in movement of such finger out of such coincidence. It can thus be determined whether the teeth on the gear to be checked meet the requirements represented by the master gear. The finger engaging the gear to be checked may also be moved toward and away from the axis of such gear on the tangent to the base circle to check the pressure angle of the teeth. By indexing the master gear and the gear to be checked each of the teeth may be checked for helix angle, tooth spacing and pressure angle.

Referring to the drawings the checking device comprises a standard including a base housing 10 having upright bearing brackets 12 and 14 formed therewith. A pair of upright spindles 16 and 18 are rotatably mounted on the base 10, in parallel relationship with respect to each other. The spindle 16 is adapted to have a master gear 20 mounted thereon for rotation therewith; and with spindle 18 is adapted to have a gear 22 to be checked mounted thereon for rotation therewith.

The spindles 16 and 18, and consequently the gears 20 and 22, are operatably interconnected together for synchronous rotation. Such interconnecting means includes a wheel 24 keyed to the spindle 16 and a similar wheel 26 keyed to the spindle 18. The wheels 24 and 26 have plane peripheral surfaces with annular side flanges at both sides thereof. A roller bearing wheel 28 is disposed between the wheels 24 and 26, and the wheel 28 is of such a width that it is received between the flanges on the wheels 24 and 26 with the peripheral surface of the wheel 28 frictionally engaging the peripheral surfaces of the wheels 24 and 26. The wheel 28 is pivotally mounted to a forked mounting member 30 by means of a shaft 32. Such member 30 has a rod 34 which projects through an enlarged opening in a boss 36 formed integrally with the base 10. The boss 36 is formed with a recess 38 therein, within which a compression spring 40 is disposed. Such spring 40 bears against the member 30 so as to resiliently urge the wheel 28 into frictional engagement with the wheels 24 and 26. The rod 34 has a stop 42 fixed to the outer end thereof, in order to limit the inner movement of the wheel 28.

It will thus be appreciated that any rotative movement imparted to the master gear 20 will in turn be imparted to the gear 22, which will move to the exact extent of the wheel 20.

While in the embodiment particularly illustrated, the wheels 24, 26 and 28 have been employed to impart the synchronous rotation to the gears 20 and 22, it will be appreciated that gearing could be employed instead within the scope of the present invention.

Checking means is mounted on the standard 10, and such checking means includes a supporting frame 44. The supporting frame has upstanding trunnions 46 and 48 formed integrally therewith, which are adapted to be pivotally connected to the standards 12 and 14 by means of pivot pins 50 and 52, respectively. The axis of the pivot pins 50 and 52 are coincident with each other and are also coincident with the axis of a worm of mating capacity and positioned in mating relation to the gear 22.

A follower finger 54 is connected to the shaft 50 for rotation therewith by means of a connector member 56. Such finger 54 has the outer end formed for point contact with a tooth of the master gear 20 and is so positioned as to lie in a plane through the axis of the shaft 50, when such plane is normal to the axes of the spindles 16 and 18. The shaft 50 is fixed to the frame 44 for rotation therewith so that as the frame is pivoted the finger 54 is correspondingly pivoted.

The frame 44 is provided with a finished surface portion 58, upon which parallel members 60 are disposed to provide guideways for a slide block 62. A conventional lead screw 64 is operatively connected to the block 62 and has its outer end rotatably supported in a mounting block 65 which is mounted to the frame 44. A crank handle 66 is connected to the screw 64 so that upon turning the crank 66, the block 62 is moved toward and away from the axis of the gear 22.

An indicator instrument is used which is generally similar to that described in Pelphrey Patent No. 2,057,970, issued Oct 20, 1936, to indicate deviations in the tooth structure of the gear 22. This means includes a checking finger 68 which is pivotally mounted to a block 70. The block 70 is pivotally connected to a plunger 72 for pivotal movement about the horizontal axis of the plunger 72 and so that the plunger may slide axially thereof. The finger 68 is of bell crank construction and is fulcrumed to the block 70 for pivotal movement about an axis normal to the axis of the plunger 72. One end of the bell crank finger is provided with an adjustably secured stop 74, the inner end of which is adapted to engage the plunger 72 of an extensometer 76, which is mounted on the slide 62 for movement therewith. The end of the finger is formed for point contact with a tooth face of the gear 22.

The extensometer 76 is of conventional construction and is suitably secured on the upper surface of the slide 62. It includes the usual recording pointer which responds to the inward and outward movement of the operating plunger 72, which is spring biased to an outward position relative to the extensometer. In accordance with conventional practice, the extensometer 76 is provided with the usual reading scale which is rotatable with respect to the body of the extensometer and which, therefore, may be set to provide a zero extensometer reading corresponding to any inward or outward position of the operating plunger. As will be further understood, the zero reading selected for operating purposes is usually one in which the bias spring associated with the operating member 72 is under compression so that, as the element engaged by the operating member is retracted, the member follows it, providing an extensometer reading on one side of the zero point and, as the element engaged by the operating member is moved to force the operating member inwardly of the extensometer, a reading is provided on the opposite side of the zero point.

The finger 68 is so constructed and positioned on the slide 62 and the guideways 60 are so positioned that, as the slide 78 is moved toward and away from the gear 22, the point of the finger which engages the side of the tooth will follow along a line representing a tangent to the base circle referred to above. Any deviations from the straight line, as the finger engages the tooth, will be indicated by the extensometer.

With the finger 54 engaging any one of the teeth of the master gear 20 and with the finger 68 engaging one of the teeth of the gear 22, by pivoting the frame 44 about its axis, it will be appreciated that the finger 54 will cause the master gear 20 to rotate with the spindle 16. A corresponding, exact rotation is thereby imparted through spindle 18 to the gear 22. As the finger 68 engages a tooth of the gear 22, it will be appreciated that any deviations in the form of the tooth on gear 22 from the form on the master gear 20, will be indicated on the extensometer. By indexing the gear 20, the gear 22 is correspondingly indexed and all of the teeth may be checked to record any deviation in the teeth form or spacing from that of the master gear.

In order to hold the frame in any of its tilted positions a segment 80 is mounted on shaft 52 and is fixed to the upright standard 14 by means of a bolt 82. The bolt 82 passes through an arcuate slot 84 formed in the segment 80 so that the segment 80 may be adjusted within limits with respect to the standard 14. The peripheral edge of the segment is provided with teeth 86. Any of such teeth are adapted to be engaged by a plunger which is disposed normal to the peripheral edge of the segment. Such plunger is adapted to be received between any pairs of the teeth so as to hold the frame 54 in any of its adjusted positions. A spring pressed plunger 90 is disposed normal to the axis of the stop plunger which engages the teeth 86, and such plunger is of conventional construction so that by pressing it inwardly the stop plunger is released from engagement with the teeth 86, while when it is allowed to return to its outer position the teeth are engaged by the stop plunger to fix the frame 44 in any of its adjusted positions.

What is claimed is:

1. Checking mechanism for worm gears comprising, in combination, a standard, a first spindle mounted on said standard and adapted to have a master gear mounted thereon, a second spindle mounted on said standard and adapted to have a gear to be checked mounted thereon, means operably interconnecting said spindles so that they rotate in synchronism, and checking means rotatably mounted on said standard, said checking means including a pair of fingers, one of such fingers being positioned to engage a tooth of the master gear and the other of said fingers being positioned to engage a tooth of the gear to be checked, means mounting said fingers for bodily rotation in unison about an axis coincident with the axis of a worm of mating capacity with and positioned in mating relation to the gear to be checked while in engagement with their respective teeth, and means recording deviations in movement from a predetermined path of said other finger.

2. Checking mechanism for worm gears comprising, in combination, a standard, a first spindle mounted on said standard and adapted to have a master gear mounted thereon, a second spindle mounted on said standard and adapted to have a gear to be checked mounted thereon, means operably interconnecting said spindles so that they rotate in synchronism, and checking means movably mounted on said standard, said checking means including a pair of fingers, one of such fingers being positioned to engage a tooth of the master gear and the other of said fingers being positioned to engage a tooth of the gear to be checked, means mounting said fingers for movement in unison while in engagement with their respective teeth, means mounting said other finger for movement into and out of coincidence with a tangent to the base circle of a worm of mating capacity with and positioned in mating relation to the gear to be checked, means for bodily moving said finger along said tangent toward and from the gear to be checked and means recording deviations in movement of said other finger out of said coincidence.

HAROLD V. CHRISTENSEN.